United States Patent Office 3,639,450
Patented Feb. 1, 1972

3,639,450
PURIFICATION OF BIS-HYDROXYALKYL ESTERS OF BENZENE DICARBOXYLIC ACIDS USING HYPOPHOSPHOROUS OR ORTHOPHOSPHOROUS ACID AND A GROUP VIII CATALYST
Lita L. Koh and Enrique R. Witt, Corpus Christi, Tex., assignors to Celanese Corporation, New York, N.Y.
No Drawing. Filed May 29, 1968, Ser. No. 732,818
Int. Cl. C07c 69/82
U.S. Cl. 260—475 PR    12 Claims

ABSTRACT OF THE DISCLOSURE

A process for treating impure bis-hydroxyalkyl esters of benzene dicarboxylic acids by treating a hypophosphorous or orthophosphorous acid-containing aqueous solution of the diester with a catalyst of a Group VIII metal. This treatment reduces the amount of impurities comprised of hydroxyalkyl esters of carboxybenzaldehyde.

BACKGROUND OF THE INVENTION

The present invention relates to the purification of bis-hydroxyalkyl esters of benzene dicarboxylic acids. More particularly the present invention relates to a method for the reduction of the amount of hydroxyalkyl esters of carboxybenzaldehyde in these bis-hydroxyalkyl esters.

Bis-hydroxyalkyl esters of benzene dicarboxylic acids, such as bis(2-hydroxyethyl) terephthalate, are well known compounds which are useful in the production of polymers such as poly(ethylene terephthalate). Various methods have been reported for making these bis-hydroxyalkyl esters such as by the reaction of a benzene dicarboxylic acid with an alkylene glycol or an alkylene oxide. For example, terephthalic acid may react with ethylene oxide or ethylene glycol to produce bis(2-hydroxyethyl) terephthalate.

Especially when these monomeric bis-hydroxyalkyl esters are to be used in the production of polymers, the purity of the monomeric diester is of considerable importance with one of the more troublesome impurities being hydroxyalkyl esters of carboxybenzaldehyde. These aldehyde impurities are usually derived from carboxybenzaldehyde impurities in the dicarboxylic acid starting material, especially when the dicarboxylic acid has been prepared by the oxidation of a xylene. Thus when m-xylene is oxidized to isophthalic acid there will usually be some 3-carboxybenzaldehyde impurities in the acid product because of incomplete oxidation of the m-xylene. When the isophthalic acid containing the 3-carboxybenzaldehyde impurity is esterified with a glycol or an alkylene oxide such as ethylene glycol or ethylene oxide to form the bis-hydroxyalkyl isophthalate, the 3-carboxybenzaldehyde impurities present will also be esterified to form the hydroxyalkyl ester of 3-carboxybenzaldehyde. Of course when p-xylene or o-xylene is oxidized to terephthalic acid or isophthalic acid, respectively, the carboxybenzaldehyde impurity will not be 3-carboxybenzaldehyde but will be that carboxybenzaldehyde corresponding to the particular xylene. Thus terephthalic acid will usually contain 4-carboxybenzaldehyde impurities and therefore bis-hydroxyalkyl esters of terephthalic acid will contain the hydroxyalkyl esters of 4-carboxybenzaldehyde as an impurity. These carboxybenzaldehyde impurities are also known as formylbenzoic acids and are also sometimes named as a derivative of the corresponding dicarboxylic acid, for example 4-carboxybenzaldehyde is also known as p-formylbenzoic acid and as terephthalaldehydic acid.

SUMMARY

It is thus an object of the present invention to provide a method for treating bis-hydroxyalkyl esters of benzene dicarboxylic acids so as to reduce the amount of hydroxyalkyl esters of carboxybenzaldehyde present. Additional objects will become apparent from the following description of the present invention.

These and other objects are accomplished by the present invention which in one of its embodiments is a process for treating a bis-hydroxyalkyl ester of a benzene dicarboxylic acid containing a hydroxyalkyl ester of a carboxybenzaldehyde as an impurity which process comprises contacting an aqueous solution of said bis-hydroxyalkyl ester which contains orthophosphorous acid or hypophosphorous acid and which is at a pH of less than 7 with a catalyst of a Group VIII metal. Hypophosphorous acid is of the formula $H_3PO_2$, sometimes written $H(H_2PO_2)$ while orthophosphorous acid is of the formula $H_3PO_3$, sometimes written as $H_2(HPO_3)$.

As may be seen from the above summary, the present process is relatively simple as it only involves contacting an orthophosphorous or hypophosphorous acid-containing aqueous solution of the bis-hydroxyalkyl ester with a catalyst of a Group VIII metal. The exact mechanism by which this purification is accomplished is not fully understood but it appears that reduction of the aldehyde group takes place so that the hydroxyalkyl esters of carboxybenzaldehyde are being reduced to the corresponding hydroxymethyl-substituted or methyl-substituted hydroxyalkyl esters of benzoic acid, which impurities are not as undesirable as the hydroxyalkyl esters of carboxybenzaldehyde. Also these reduced compounds may be more easily separated from the bis-hydroxyalkyl esters, if desired. The present process may be used in the purification of hydroxyalkyl esters of benzene dicarboxylic acids such as terephthalic acid, isophthalic acid, and phthalic acid although it is especially applicable to terephthalic acid, isophthalic acid or mixtures thereof with best results being obtained when treating bis(2-hydroxyethyl)terephthalate. The hydroxyalkyl esters of benzene dicarboxylic acids to be treated in accordance with the present invention should generally have from 1 to 5 carbon atoms in each of the hydroxyalkyl portions of the diesters. The hydroxyl group in the hydroxyalkyl moiety may be located at various positions along the alkyl chain but will usually be located in the beta or "2" position when the bis-hydroxyalkyl ester has been prepared by reacting the benzene dicarboxylic acid with an alkylene oxide such as ethylene oxide or propylene oxide.

The process, which may be carried out in either a batchwise or in a continuous manner, begins by obtaining an aqueous solution of the crude bis-hydroxyalkyl ester to be treated and this solution may contain practically any amount of the diester as long as it is soluble. Generally the aqueous solution should contain between about 3 and 50% by weight of the diester based on the combined weight of the diester and water but preferably contains from about 8–40 weight percent of the diester. The aqueous diester solution should be at a pH of below 7.0 but no adjustment of the pH will generally be necessary since most aqueous solutions of a bis-hydroxyalkyl ester of a benzene dicarboxylic acid will have a pH of from about 3.0 to 6.0. To the aqueous solution there is then added a small amount of hypophosphorous acid or orthophosphorous acid and the resulting solution contacted with a catalyst of a Group VIII metal. It is also within the scope of the present invention to generate the hypophosphorous or orthophosphorous acid in situ in the aqueous bis-hydroxyalkyl ester solution such as by adding a salt of the desired acid together with an equivalent amount of strong mineral acid. Thus sodium hypophosphite, $NaH_2PO_2$, and hydrochloric acid could be added to the aqueous solution so as to form hypophosphorous acid. Sodium orthophosphite, $Na_2HPO_3.5H_2O$ or $$NaH_2PO_3.2\tfrac{1}{2}H_2O$$

could likewise be utilized to generate orthophosphorous acid. The preferred method however is direct addition of the acid itself so as to avoid contamination of the bis-hydroxyalkyl esters with salts such as NaCl which are generated when forming the acid in situ as described above. It is of course understood that the hypophosphorous or orthophosphorous acid could first be added to or generated in situ in the water and then the bis-hydroxyalkyl ester added thereto. The amount of hypophosphorous or orthophosphorous acid to be utilized depends mainly on the amount of hydroxyalkyl ester of carboxybenzaldehyde present, the larger amount of this impurity the greater the amount of the phosphorous-containing acid that is required. Usually the amount of hypophosphorous acid or orthophosphorous acid to be added will be from about 0.05 to 4.0 parts by weight per part by weight of the hydroxyalkyl ester of carboxybenzaldehyde that is present but is preferably from about 0.1 to 2.0 parts by weight per part by weight of the aldehyde. Greater or lesser amounts than this may be used but lesser amounts generally will not provide adequate purification while greater amounts usually result in wasted acid. Of orthophosphorous acid and hypophosphorous acid, hypophosphorous is the preferred acid to be used in the process of the present invention.

The reaction conditions to be utilized in the present invention are fairly mild with suitable temperatures ranging from about 60 to 130° C., preferably from 70 to 110° C. The pressure needs to be only that which is sufficient to maintain the aqueous solution as a liquid phase and the pressure may range from subatmospheric to superatmospheric. The most convenient pressure at which to operate is atmospheric, however, greater pressures than this will be required when operating at the higher temperatures. Generally the pressure will be from atmospheric to 100 p.s.i.g. The treatment is carried out for a period of time which is sufficient to lower the amount of hydroxyalkyl esters of carboxybenzaldehyde to the desired level, conveniently for 3 to 90 minutes although from 8 to 40 minutes is the more usual time required.

As catalyst one can use a catalyst of any of the metals of Group VIII of Mendelyeev's Periodic Table. These metals are iron, ruthenium, osmium, iridium, rhodium, nickel, cobalt, palladium and platinum. Of the Group VIII metals, platinum, palladium, rubidium, nickel and rhodium are preferred with catalysts of palladium being preferred over any of the others. One can also use compounds of these metals which are reduced to the metal under the conditions of operation such as palladium oxide, nickel oxide, cobalt nitrate and palladium chloride. The catalyst may be supported or unsupported with the supports being either neutral such as charcoal, basic such as kaolin or acidic such as alumina. Preferably the support is basic or neutral. Supports that may be utilized other than those listed above include asbestos, diatomaceous earth, kiselguhr, alpha and gamma alumina, calcium carbonate, and silica-alumina. When these catalysts become spent they may easily be regenerated by washing with a solution of 5–30% hydrogen peroxide in water.

After the aqueous solution of the bis-hydroxyalkyl ester has been treated in accordance with the present invention so as to reduce the amount of hydroxyalkyl esters of carboxybenzaldehyde present, the bis-hydroxyalkyl ester product may be recovered by any convenient method such as by crystallization. Usually cooling of the aqueous solution to below 40° C., preferably to about 25° C. will be sufficient to crystallize the diester. If desired other treating steps may be performed before crystallization.

The following examples are given in order to illustrate specific embodiments of the present invention.

EXAMPLE I

Several runs were made in which from 40–60 grams of bis(2-hydroxyethyl) terephthalate (BHET) containing 600 p.p.m. of the hydroxyethyl ester of 4-carboxybenzaldehyde (HECBA) were dissolved in 200 milliliters of water and poured into a 500 milliliter 3-neck flask equipped with a stirrer, reflux condenser, and thermometer. When the temperature of the stirred mixture reached 95 to 100° C., 10 grams of catalyst and varying amounts of hypophosphorous acid were added, the hypophosphorous acid being added as a 0.5% aqueous solution. After about 15 to 20 minutes the hot mixture was filttered and then cooled to about 25° C. so as to crystallize the BHET. After the thus crystallized terephthalate product was recovered by filtration it was air dried for one day and then analyzed for the amount of HECBA by the colorimetric method. The results of the several runs are shown in Table I along with the amount of terephthalate utilized in each run, the grams of $H_3PO_2$ added in each run, and the particular catalyst utilized in each run. The number of grams of $H_3PO_2$ indicated in the table is not the amount of the hypophosphorous acid solution added but of the $H_3PO_2$ itself. All percentages are by weight.

TABLE I

| Run No. | Charge | | | Product HECBA, p.p.m. |
|---|---|---|---|---|
| | BHET, g. | $H_3PO_2$, g. | Catalyst | |
| 1* | 40 | 0.05 | 0.5% nickel on kieselguhr | 30 |
| 2 | 60 | 0.04 | 0.5% palladium oxide on kaolin | 29 |
| 3 | 60 | 0.005 | do | 158 |
| 4 | 60 | 0.03 | 0.5% palladium on charcoal | 60 |
| 5 | 60 | 0.025 | 0.5% palladium on γ-alumina | 197 |
| 6 | 60 | 0.025 | 0.5% palladium on activated alumina | 184 |

*Run No. 1 utilized 20 g. of catalyst.

EXAMPLE II

A steam jacketed column was loaded with a wire ring, glass wool, glass beads and then 125 grams of a 0.5% palladium on kaolin catalyst which had been prewashed with cold water was added. The column was then steam heated and washed with water until the wash was clear and contained no fines. A prefiltered batch of 1600 grams of crude bis(2-hydroxyethyl) terephthalate dissolved in 8 liters of water and also containing 1 gram of hypophosphorous acid was poured through the column from a heated separatory funnel at a rate of about 18 milliliters per minute. The solution removed from the bottom of the column was cooled to about 25° C. so as to crystallize the bis(2-hydroxyethyl terephthalate, filtered and oven dried at about 60° C. The terephthalate product thus recovered contained only about 20 p.p.m. of the hydroxyethyl ester of 4-carboxylbenzaldehyde while the crude bis(2-hydroxyethyl) terephthalate had contained about 600 p.p.m. of this impurity.

EXAMPLE III

The procedure of Example II was followed except that the catalyst utilized was a 0.5% palladium on activated charcoal catalyst. The terephthalate product contained about 134 p.p.m. of the hydroxyethyl ester of 4-carboxybenzaldehyde.

The above examples are only illustrative and are not to be taken in a limiting sense. Similar results may be obtained with the other Group VIII metals and with orthophosphorous acid instead of hypophosphorous acid.

The embodiments of the invention in which an exclusive property or privilege is claimed are defined as follows:

1. A process for treating a bis-hydroalkyl ester of a benzene dicarboxylic acid containing a hydroxyalkyl ester of a carboxybenzaldehyde as an impurity which process comprises contacting an aqueous solution of said bis-hydroxyalkyl ester which contains hypophosphorous acid or orthophosphorous acid and which is at a pH of less than 7 with a catalyst selected from the group consisting of iron, ruthenium, osmium, iridium rhodium, nickel, cobalt, palladium and platinum metals, and compounds of said metals which are reduced to the metal under conditions of operation.

2. The process of claim 1 wherein said benzene dicarboxylic acid is terephthalic acid, isophthalic acid, or mixtures thereof, wherein said carboxybenzaldehyde is 4-carboxybenzaldehyde, 3-carboxybenzaldehyde, or mixtures thereof, and wherein each of the hydroxyalkyl portions of said diester contain from 1 to 5 carbon atoms.

3. The process of claim 1 wherein the temperature is from about 60 to 130° C. and wherein said aqueous solution contains from about 3 to 50 percent by weight of said bis-hydroxyalkyl ester based on the combined weight of said bis-hydroxyalkyl ester and water.

4. The process of claim 1 wherein the hypophosphorous acid is present in amounts of from about 0.05 to 4.0 parts by weight per part by weight of said hydroxyalkyl ester of a carboxybenzaldehyde.

5. The process of claim 1 wherein said Group VIII metal is palladium.

6. The process of claim 1 wherein the hypophosphorous acid or orthophosphorous acid is present by addition of the acid itself.

7. The process of claim 1 wherein the hypophosphorous acid or orthophosphorous acid is generated in situ.

8. The process of claim 1 wherein hypophosphorous acid is utilized.

9. The process of claim 1 wherein bis(2-hydroxyethyl) terephthalate containing the hydroxyethyl ester of 4-carboxybenzaldehyde as an impurity is treated by contacting with said catalyst of a Group VIII metal an aqueous solution containing from about 8 to 40 percent by weight of said terephthalate to which has been added from 0.05 to 4.0 parts by weight of hypophosphorous acid or orthophosphorous acid per part by weight of said hydroxyethyl ester of 4-carboxylbenzaldehyde.

10. The process of claim 9 wherein the temperature is from about 70 to 110° C.

11. The process of claim 10 wherein the catalyst is palladium metal or a palladium oxide on a basic or neutral support.

12. The process of claim 11 wherein the acid is hypophosphorous acid which has been added in an amount of from about 0.1 to 2.0 parts per part by weight of said hydroxyethyl ester of 4-carboxybenzaldehyde.

References Cited

UNITED STATES PATENTS 3,288,849  11/1966  Meyer -------------- 260—525
3,456,001  7/1969  Olsen -------------- 260—525

LORRAINE A. WEINBERGER, Primary Examiner

E. J. SKELLY, Assistant Examiner